(12) United States Patent
Chakraborty et al.

(10) Patent No.: US 8,784,520 B2
(45) Date of Patent: Jul. 22, 2014

(54) METHODS OF FUNCTIONALIZING MICROSCALE DIAMOND PARTICLES

(75) Inventors: Soma Chakraborty, Houston, TX (US); Gaurav Agrawal, Aurora, CO (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/174,031

(22) Filed: Jun. 30, 2011

(65) Prior Publication Data

US 2013/0000209 A1    Jan. 3, 2013

(51) Int. Cl.
    *C09K 3/14*     (2006.01)

(52) U.S. Cl.
    USPC ............ 51/298; 51/302; 51/307; 51/309; 423/439; 536/124; 562/405; 562/498; 564/458; 568/817

(58) Field of Classification Search
    None
    See application file for complete search history.

(56) References Cited

U.S. PATENT DOCUMENTS

| | | | | |
|---|---|---|---|---|
| 3,663,475 A * | 5/1972 | Figiel | | 51/306 |
| 4,063,907 A | 12/1977 | Lee et al. | | |
| 5,759,216 A * | 6/1998 | Kanada et al. | | 51/309 |
| 6,337,060 B1 | 1/2002 | Hiraki et al. | | |
| 6,342,301 B1 * | 1/2002 | Yoshida et al. | | 428/408 |
| 6,372,002 B1 | 4/2002 | D'Evelyn et al. | | |
| 7,572,332 B2 * | 8/2009 | Gruen | | 117/87 |
| 2004/0118762 A1 * | 6/2004 | Xu et al. | | 210/198.2 |
| 2005/0158549 A1 * | 7/2005 | Khabashesku et al. | | 428/403 |
| 2005/0189279 A1 * | 9/2005 | Xu et al. | | 210/198.2 |
| 2006/0081681 A1 | 4/2006 | Pipkin | | |
| 2007/0082200 A1 * | 4/2007 | Gruen | | 428/408 |
| 2009/0218276 A1 * | 9/2009 | Linford et al. | | 210/506 |
| 2010/0089832 A1 * | 4/2010 | Linford et al. | | 210/656 |
| 2010/0140562 A1 * | 6/2010 | Shenderova et al. | | 252/511 |
| 2010/0187925 A1 | 7/2010 | Tingler et al. | | |
| 2012/0032543 A1 | 2/2012 | Chakraborty et al. | | |

OTHER PUBLICATIONS

Brieva, A.C. et al., "A sensible route to covalent functionalization of carbon nanoparticles with aromatic compounds", Carbon 47 (2009) pp. 2812-2820.*
Hwang, Kuo Chu et al., "Facile Surface Functionalization of Nanodiamonds", Langmuir 26, 5 (2010) pp. 3685-3689.*
Huang, Weijie et al., "Solubilization of Single-Walled Carbon Nanotubes with Diamine-Terminated Oligomeric Poly(ethylene Glycol) in Different Functionalization Reactions", Nano Letters vol. 3, No. 4 (2003) pp. 565-568.*
Liu, Yu et al., "Functionalization of Nanoscale Diamond Powder: Fluoro-, Alkyl-, Amino-, and Amino Acid-Nanodiamond Derivatives", Chem. Mater. 16 (2004) pp. 3924-3930.*
U.S. Appl. No. 61/324,142, filed Apr. 14, 2010 and entitled Method of Preparing Polycrystalline Diamond from Derivatized Nanodiamond, filed Apr. 14, 2010.
Liu et al., Functionalization of Carbon Nano-Onions by Direct Fluorination, Chem. Mater. vol. 19, (2007), pp. 778-786.

* cited by examiner

*Primary Examiner* — Kaj K Olsen
*Assistant Examiner* — Ross J Christie
(74) *Attorney, Agent, or Firm* — TraskBritt

(57) ABSTRACT

Methods of treating a plurality of particles involve functionalizing a plurality of microscale diamond particles by covalently bonding one or more molecular groups selected from OH functional groups, —COOH functional groups, —R—COOH functional groups, wherein R includes alkyls, -Ph-COOH functional groups, wherein Ph includes phenolics, polymers, oligomers, monomers, glycols, sugars, ionic functional groups, metallic functional groups, and organometallic functional groups to outer surfaces of at least some particles of the plurality of microscale diamond particles. A stability of the functionalized plurality of microscale diamond particles in dispersion is increased as compared to a plurality of microscale diamond particles that has not been functionalized.

20 Claims, 4 Drawing Sheets

METHODS OF FUNCTIONALIZING MICROSCALE DIAMOND PARTICLES

FIELD

Embodiments of the disclosure relate generally to functionalized microscale diamond particles and methods of functionalizing microscale diamond particles. Specifically, embodiments of the disclosure relate to functionalized microscale diamond particles that have increased stability when dispersed in a continuous phase material.

BACKGROUND

Diamond has proven to be useful in a wide variety of applications. For example, cutting elements used in earth-boring tools often include a polycrystalline diamond (PCD) material, which may be used to form polycrystalline diamond compact cutting elements (often referred to as "PDCs"). Such polycrystalline diamond cutting elements are conventionally formed by sintering and bonding together relatively small diamond grains or crystals under conditions of high temperature and high pressure in the presence of a catalyst (e.g., cobalt, iron, nickel, or alloys and mixtures thereof) to form a layer of polycrystalline diamond material on a cutting element substrate. These processes are often referred to as high temperature/high pressure (or "HTHP") processes. The cutting element substrate may comprise a cermet material (i.e., a ceramic-metal composite material) comprising a plurality of particles of hard material in a metal matrix, such as, for example, cobalt-cemented tungsten carbide. In such instances, catalyst material in the cutting element substrate may be drawn into the diamond grains or crystals during sintering and catalyze formation of a diamond table from the diamond grains or crystals. In other methods, powdered catalyst material may be mixed with the diamond grains or crystals prior to sintering the grains or crystals together in an HTHP process.

Earth-boring tools for forming wellbores in subterranean earth formations that may include a plurality of cutting elements secured to a body include, for example, fixed-cutter earth-boring rotary drill bits (also referred to as "drag bits"). Such fixed-cutter bits include a plurality of cutting elements that are fixedly attached to a bit body of the drill bit, conventionally in pockets formed in blades and other exterior portions of the bit body. Other earth-boring tools may include rolling cone earth-boring drill bits, which include a plurality of cones attached to bearing pins on legs depending from a bit body. The cones may include cutting elements (sometimes called "teeth") milled or otherwise formed on the cones, which may include hardfacing on the outer surfaces of the cutting elements, or the cones may include cutting elements (sometimes called "inserts") attached to the cones, conventionally in pockets formed in the cones. Cutting elements that include diamond increase the useful life of the earth-boring tools to which they are attached because the diamond increases the strength and abrasion resistance of the tools. Still other earth-boring tools incorporate diamond that may not be polycrystalline diamond. For example, impregnated earth-boring drill bits generally comprise a plurality of diamond particles, which may comprise polycrystalline diamond or may simply comprise monocrystalline diamond, embedded in a matrix material.

Diamonds also have desirable properties that render them useful in still other applications. For example, the high strength and abrasion resistance of diamonds renders them useful in grinding, polishing, and machining applications. In addition, diamonds are commonly used as additives to coatings that may be applied, for example, to abrasive articles or other structures. Increased thermal conductivity of diamonds renders them useful as particles dispersed in lubricants, such as motor and pump oils, because such lubricants often serve to cool the parts they lubricate. Furthermore, increased electrical conductivity of some diamonds (e.g., blue diamonds and synthetic diamonds formed by chemical vapor deposition act as semiconductors, though most diamonds act as dielectrics) renders them useful as fillers in polymers and elastomers, where increased electrical conductivity in at least some portion of the polymers and elastomers is desirable.

During use, during processing, or both, diamond particles may be dispersed in a fluid or gel continuous phase material to form a paste or slurry. For example, a suspension comprising dispersed diamond particles may be employed to deposit a uniform quantity of the diamond particles in a mold for subsequent processing into a PDC cutting element. It is known, however, that dispersed diamond particles may tend to agglomerate and sediment due to their relative instability in common continuous phase materials, such as water and alcohol.

Some attempts have been made to enhance the stability of diamond particles in suspensions. For example, U.S. Pat. No. 6,337,060, issued Jan. 8, 2002, to Hiraki et al. discloses, among other things, that diamond particles of 2 μm or less may be rendered hydrophilic by boiling in a concentrated sulfuric acid solution at a temperature greater than 200° C. Likewise, U.S. Pat. No. 6,372,002, issued Apr. 16, 2002, to D'Evelyn et al. discloses, among other things, that functionalized diamond may be produced by boiling diamonds in a strongly oxidizing acid, which may produce carboxyl groups (—COOH) on the diamond surface to render it hydrophilic. U.S. Provisional Application No. 61/324,142, filed Apr. 14, 2010 and entitled "Method of Preparing Polycrystalline Diamond from Derivatized Nanodiamond," discloses, among other things, that nanodiamonds may be derivatized to include functional groups on the surface thereof and then mixed with microscale diamonds, which mixture is then used to form a polycrystalline diamond material.

BRIEF DESCRIPTION OF THE DRAWINGS

While the specification concludes with claims particularly pointing out and distinctly claiming that which is regarded as the present invention, various features and advantages of embodiments of the disclosure may be more readily ascertained from the following description of embodiments of the disclosure when read in conjunction with the accompanying drawings, in which:

DETAILED DESCRIPTION

Figure 1:
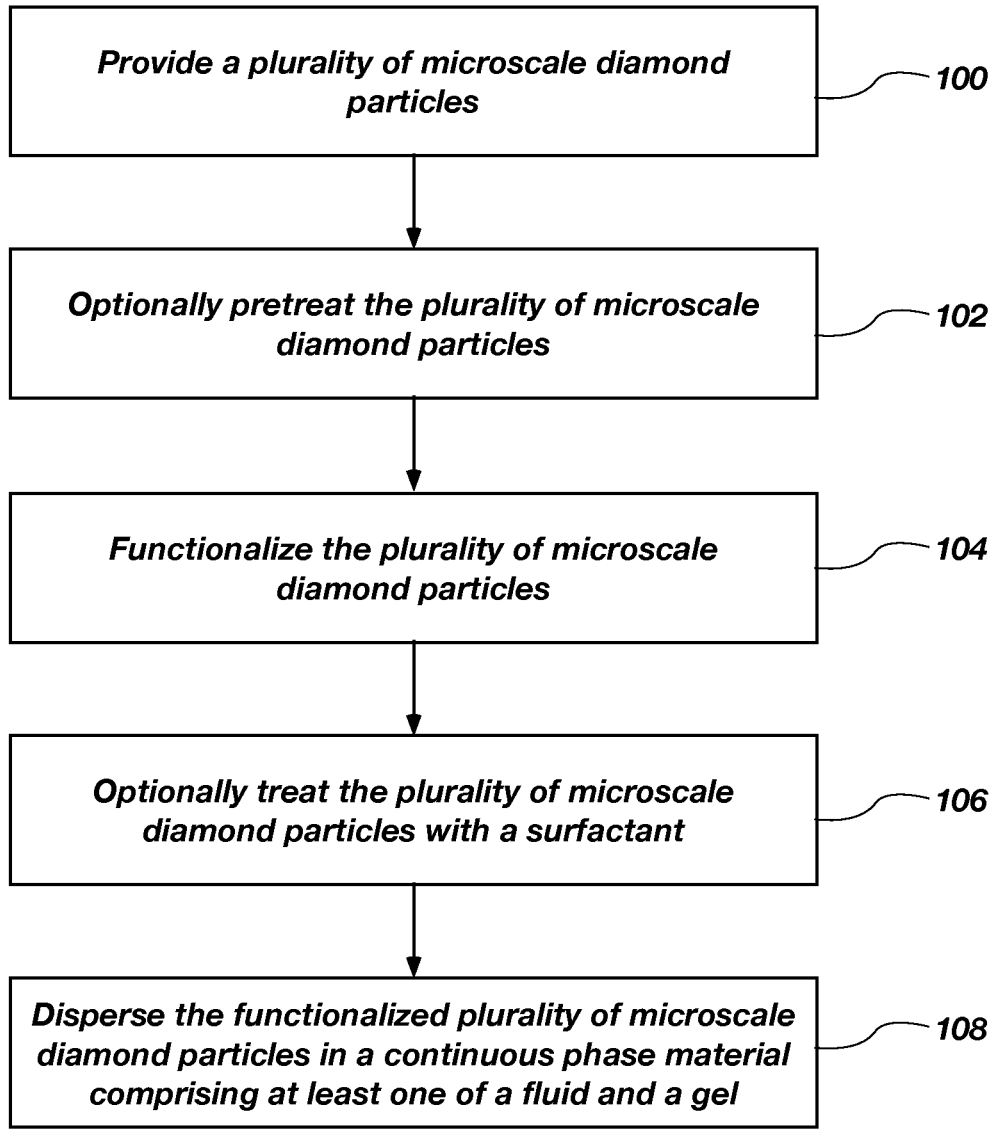
FIG. 1 is a diagrammatic representation of a method of dispersing a plurality of functionalized diamond particles in a continuous phase material comprising a liquid or a gel.

The illustrations presented herein are not meant to be actual views of any particular particle, cutting element, mold, or earth-boring tool, but are merely idealized representations that are employed to describe the embodiments of the disclosure. Thus, the drawings are not necessarily to scale and relative dimensions may have been exaggerated or diminished for the sake of clarity. Additionally, elements common between figures may retain the same or similar numerical designation.

Embodiments of the disclosure relate generally to methods for functionalizing microscale diamond particles. More specifically, embodiments of the disclosure relate to microscale diamond particles that have been functionalized to increase the stability of the microscale diamond particles when dispersed in a continuous phase material (e.g., a fluid, gel, or solid continuous phase material).

The teems "earth-boring tool" and "earth-boring drill bit," as used herein, mean and include any type of bit or tool used for drilling during the formation or enlargement of a wellbore in a subterranean formation and include, for example, fixed-cutter bits, rolling cone bits, impregnated bits, core bits, eccentric bits, bicenter bits, hybrid bits as well as reamers, mills, and other drilling bits and tools known in the art.

As used herein, the term "polycrystalline material" means and includes any structure comprising a plurality of grains (i.e., crystals) of material (e.g., diamond) that are bonded directly together by inter-granular bonds. The crystal structures of the individual grains of the material may be randomly oriented in space within the polycrystalline material.

As used herein, the terms "inter-granular bond" and "inter-bonded" mean and include any direct atomic bond (e.g., covalent, metallic, etc.) between atoms in adjacent grains of superabrasive material.

As used herein, the terms "nanoparticle" and "nanoscale" mean and include any particle (e.g., a crystal or grain) having an average particle diameter of between about 1 nm and 500 nm.

As used herein, the term "sub-micron sized" means and includes any particle (e.g., a crystal or grain) having an average particle diameter of between about 501 nm and 1 μm.

As used herein, the term "microscale" means and includes any particle (e.g., a crystal or grain) having an average particle diameter of between about 2 μm and 500 μm.

As used herein, the term "dispersion" means and includes any system wherein particles of a first material are dispersed in a continuous phase of another material. For example, dispersions include suspensions, colloids, and solutions. Both the first material of the particles and the other material of the continuous phase may comprise a fluid (i.e., gas, liquid, or a combination of gas and liquid), a gel, or a solid in any combination.

As used herein, the term "functional groups" means and includes specific groupings of atoms within molecules that are responsible for the characteristic chemical interactions (e.g., chemical reactions) of those molecules. As specific, non-limiting examples, functional groups include —OH functional groups (i.e., hydroxyl functional groups), —COOH functional groups (i.e., carboxyl functional groups), —R—COOH functional groups, wherein R comprises alkyls, -Ph-COOH functional groups, wherein Ph comprises phenolics, ionic functional groups, metallic functional groups, and organo-metallic functional groups.

As used herein, the term "functionalize" means and includes bonding (i.e., by any type of chemical bond, including covalent, ionic, metallic, etc.) at least one functional group to another atom or molecule. By way of example, functionalizing a particle may include covalently bonding a molecule containing a functional group to another atom or molecule located at the outer surface of the particle.

As used herein, the term "molecular groups" means and includes molecules or portions of molecules that may include functional groups as portions of the atomic structure of the molecules or portions of molecules. As specific, non-limiting examples, molecular groups may include —OH functional groups (i.e., hydroxyl functional groups), —COOH functional groups (i.e., carboxyl functional groups), —R—COOH functional groups, wherein R comprises alkyls, -Ph-COOH functional groups, wherein Ph comprises phenolics, polymers, oligomers, monomers, glycols, sugars, molecules comprising ionic functional groups, metallic functional groups, and organo-metallic functional groups.

As used herein, the term "tungsten carbide" means any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

Referring to FIG. 1, a diagrammatic representation of a method of dispersing a plurality of functionalized diamond particles in a fluid or gel continuous phase material comprising is shown. As indicated generally at 100, a plurality of microscale diamond particles may be provided. The plurality of microscale diamond particles may exhibit a mono-modal or multi-modal (e.g., bi-modal, tri-modal, etc.) particle size distribution. The plurality of microscale diamond particles may comprise natural diamond, synthetic diamond, or a combination of natural and synthetic diamond. Further more, the plurality of microscale diamond particles may be used as received or formed or may be sorted and cleaned by various processes to remove contaminants and non-diamond carbon allotropes that may be present, such as, for example, residues of amorphous carbon or graphite.

In some embodiments, the outer surface of the plurality of microscale diamond particles may optionally be pretreated, as indicated generally at 102. For example, the plurality of microscale diamond particles may be heated to graphitize the outer surface thereof. As a specific, non-limiting example, the plurality of microscale diamond particles may be exposed to a temperature of about 1,400° C. or greater in a vacuum or a non-oxidizing atmosphere to cause the outer surface thereof to form a graphite crystalline structure, rather than the diamond crystalline structure that was present previously. Graphitizing the outer surface of the plurality of microscale diamond particles may enable molecular groups containing desirable functional groups to more easily form covalent bonds with the outer surface of the plurality of microscale diamond particles. In contrast to diamond nanoparticles, the outer surface of microscale diamond particles may not typically comprise a "carbon onion" (i.e., concentric graphene spherical shells), with which molecular groups may more easily form covalent bonds. Accordingly, when it is said that molecular groups may be covalently bonded to the outer surface of a plurality of microscale diamond particles, the molecular groups may be bonded to allotropes of carbon that do not comprise carbon onions, such as, for example, diamond or graphite. Thus, rendering the outer surface of the plurality of microscale diamond particles graphitic may similarly enable molecular groups to more easily form covalent bonds with the outer surface of the plurality of microscale diamond particles.

In some embodiments, the plurality of microscale diamond particles may be pretreated to covalently bond at least one of -halides, —COOH, and —$NH_2$ groups on the outer surface thereof. Such pretreatment may be performed instead of or in addition to, the graphitization pretreatment described previously. Halides may be covalently bonded to the outer surface of the plurality of microscale diamond particles by, for example, fluorination. As a specific, non-limiting example, flourination may be accomplished by exposing the plurality of microscale diamond particles to fluorine gas or a mixture of fluorine and hydrogen gases at temperatures of between 50° C. and 500° C. at atmospheric pressure for a reaction duration of between 60 minutes and 2 days. In some embodiments, the plurality of microscale diamond particles may be fluorinated with a flow reactor system that is vented to the atmosphere. Fluorine may thus form covalent bonds with the outer surface of the plurality of diamond particles. Fluorination may also serve to deagglomerate the plurality of microscale particles, which may have a tendency to agglomerate prior to such pretreatment. Such agglomeration may decrease the stability of the plurality of microscale diamond particles when dispersed in a fluid or gel continuous phase material (e.g., to form a slurry or paste), hastening sedimentation.

The plurality of microscale diamond particles may be functionalized by covalently bonding molecular groups to the outer surface thereof, as indicated generally at 104. In embodiments where the plurality of microscale diamond particles is pretreated, the outer surface of the plurality of microscale diamond particles may subsequently be functionalized by covalently bonding molecular groups to the outer surface thereof. The molecular groups covalently bonded to the outer surface of the plurality of microscale diamond particles may increase the aqueous stability of the plurality of microscale diamond particles as compared to a plurality of microscale diamond particles that have not been functionalized. Suitable molecular groups may comprise, for example, —OH functional groups (i.e., hydroxyl functional groups), —COOH functional groups (i.e., carboxyl functional groups), —R—COOH functional groups, wherein R comprises alkyls, -Ph-COOH functional groups, wherein Ph comprises phenolics, polymers, oligomers, monomers, glycols, sugars, ionic functional groups, metallic functional groups, organo-metallic functional groups, and other molecular groups known in the art to increase the stability of particles to which they may be covalently bonded when dispersed in a fluid or gel continuous phase material.

Thus, in embodiments where the plurality of microscale diamond particles has been pretreated by covalently bonding at least one of -halides, —COOH, and —$NH_2$ groups to the outer surface thereof, the -halides, —COOH, and/or —$NH_2$ groups covalently bonded to the outer surface of the plurality of microscale diamond particles may be reacted with selected functionalizing agents, which may replace or simply bond to the -halides, —COOH, and/or —$NH_2$ groups bonded to the outer surface of the plurality of diamond particles with other molecular groups. As a specific, non-limiting example, a fluorinated plurality of microscale diamond particles may be reacted with a glycol, such as, for example, ethylene glycol, at a temperature of between 100° C. and 200° C. at atmospheric pressure for between about 4 hours and about 12 hours to form a functionalized plurality of microscale diamond particles having an increased stability when dispersed in a fluid or gel continuous phase material due to the glycol covalently bonded to the outer surface of the plurality of microscale diamond particles.

Introduction of functional groups by derivatizing the olefinic functionality associated with the outer surface of a microscale diamond particle may be effected by any of numerous known methods for direct carbon-carbon bond formation to an olefinic bond, or by linking to a functional group derived from an olefin. Exemplary methods of functionalizing may include, but are not limited to, reactions such as oxidation or oxidative cleavage of olefins to form alcohols, diols, or carbonyl groups including aldehydes, ketones, or carboxylic acids; diazotization of olefins proceeding by the Sandmeyer reaction; intercalation/metallization of the microscale diamond particle by treatment with a reactive metal such as an alkali metal including lithium, sodium, potassium, and the like, to form an anionic intermediate, followed by treatment with a molecule capable of reacting with the metalized microscale diamond particle such as a carbonyl-containing species (e.g., carbon dioxide, carboxylic acids, anhydrides, esters, amides, imides, etc.), an alkyl species having a leaving group such as a halide (e.g., Cl, Br, I), a tosylate, a mesylate, or other reactive esters such as alkyl halides, alkyl tosylates, etc.; molecules having benzylic functional groups; use of transmetalated species with boron, zinc, or tin groups which react with, for example, aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, or the like.

In some embodiments, the plurality of microscale diamond particles may be functionalized to increase its stability when dispersed in a fluid or gel continuous phase material without requiring pretreatment. For example, the plurality of microscale diamond particles may be reacted with a reducing agent. Suitable reducing agents include, for example, borane, lithium aluminum hydride, and other reducing agents known in the art. The reducing agent may cause, for example, —OH functional groups to covalently bond to the outer surface of the plurality of microscale diamond particles. Such —OH functional groups may increase the stability of the plurality of microscale diamond particles on which they are formed because they may form hydrogen bonds with the fluid or gel continuous phase material in which the plurality of microscale diamond particles may be dispersed. As a specific, non-limiting example, a plurality of microscale diamond particles may be reacted with borane at between 80° C. and 100° C. (e.g., at 90° C.) at atmospheric pressure for between about 4 hours and about 12 hours to form —OH groups on the outer surface of the plurality of diamond particles.

In some embodiments, the outer surface of the plurality of microscale diamond particles may optionally be treated with a surfactant, as indicated generally at 106. The surfactant may act as a dispersant and further increase the aqueous stability of the plurality of microscale diamond particles. Suitable surfactants comprise, for example, anionic surfactants, nonionic surfactants, and polycarbonic surfactants. As a specific, non-limiting example, ammonium polycarbonate may be used as a surfactant. The surfactant may adhere to the outer surface of the plurality of microscale diamond particles through adsorption and other non-covalent interactions. By way of example, hydrophilic groups of the surfactant that has adhered to the outer surface of the plurality of microscale diamond particles may increase the stability of the plurality of microscale diamond particles in an aqueous dispersion. In some embodiments, the plurality of microscale diamond particles may be both functionalized and treated with a surfactant to increase the stability of the plurality of microscale diamond particles when dispersed in a fluid or gel continuous phase material. In other embodiments, some of the plurality of microscale diamond particles may functionalized, while others of the plurality of microscale particles may be treated with a surfactant to increase the stability thereof when dispersed in a fluid or gel continuous phase material. In still other embodiments, the plurality of microscale diamond particles may be either functionalized or treated with a surfactant to increase the stability of the plurality of microscale diamond particles when dispersed in a fluid or gel continuous phase material.

After functionalization, the plurality of microscale diamond particles may be dispersed in a fluid or gel continuous phase material, as indicated generally at 108, to form a suspension (e.g., a slurry or paste). Common fluid or gel continuous phase materials may comprise, for example, water (e.g., deionized water), aqueous solutions having a pH of between 2 and 10, water miscible organic solvents (e.g., methanol, ethanol, isopropanol, n- and t-butanol, 2-methoxyethanol (methyl cellosolve), 2-ethoxyethanol (ethyl cellosolve), 1-methoxy-2-propanol, dimethylsulfoxide, N,N-dimethylformanide, N,N-dimethylacetamide, N-methylpyrrolidone, gamma-butyrolactone, acetone, cyclohexanone, or other alcohols), organic solvents (e.g., hydrocarbon-based oils), or any combination of these. Specific, non-limiting, suitable organic solvents are disclosed, for example, in U.S. patent application Ser. No. 13/021,137 entitled "Oil Composition Comprising Functionalized Nanoparticles," the disclosure of which is hereby incorporated herein in its entirety by this reference. The dispersed plurality of microscale diamond particles may form a uniform suspension. As used herein, "uniform" means that the composition of the suspension, analyzed at random locations in the mixing vessel, has less than 5% variation in solids content, specifically less than 2% variation in solids content, and more specifically less than 1% variation in solids content, as determined by drying a sample of the suspension. In an embodiment, the suspension has a total 12 solids content (functionalized microscale diamond particles, and any other solids that may be dispersed in the suspension), of 0.5 to 95 wt %, specifically 1 to 90 wt %, more specifically 10 to 80 wt %, and still more specifically 10 to 50 wt %, based on the total weight of the suspension.

In some embodiments, a binder may, optionally, be mixed into the suspension to aid in binding the plurality of microscale diamond particles together and retaining shape during further processing. Any suitable binder may be used provided the binder does not significantly adversely affect the desired properties of the resulting material (e.g., a polycrystalline diamond material). The binder may comprise, for example, a metal material such as a cobalt containing material, a polymeric material such as a polyacrylate, or polyvinylbutyral, an organic material such as a cellulosic material, a combination of these, or other binders known in the art.

In addition to the plurality of microscale diamond particles, diamond nanoparticles and sub-micron sized diamond particles may optionally be dispersed in the suspension in some embodiments. For example, the plurality of microscale diamond particles, optional diamond nanoparticles, and an optional powdered catalyst material may be mixed with a fluid or gel continuous phase material to form a uniform suspension. Thus, the diamond particles dispersed in the suspension may exhibit a multi-modal particle size distribution due to the inclusion of microscale diamond particles, optional diamond nanoparticles, and/or optional sub-micron sized diamond particles. In addition, particles within the general particle size categorized of microscale, sub-micron sized, and nanoscale may exhibit a multi-modal particle size distribution within each category. In other embodiments, however, the suspension may be free of diamond nanoparticles and sub-micron sized diamond particles, the only particles dispersed in the fluid or gel continuous phase material being microscale diamond particles.

The functionalized plurality of microscale diamond particles may remain in the suspension longer than a similar plurality of microscale diamond particles that has not been functionalized. The molecular groups covalently bonded to the outer surface of the plurality of microscale diamond particles may foam non-covalent bonds (e.g., polar-to-polar interactions) with the fluid or gel continuous phase material, which may enable the functionalized plurality of microscale diamond particles to remain dispersed in the suspension for a longer period of time than if the plurality of microscale particles had not been functionalized. As a specific, non-limiting example, the functionalized plurality of microscale diamond particles may form hydrogen bonds with an aqueous liquid continuous phase material (e.g., water). Thus, functionalizing the plurality of microscale diamond particles may increase the stability (e.g., the aqueous stability) of the plurality of microscale diamond particles when dispersed in a fluid or gel continuous phase material. In embodiments where sub-micron sized and/or nanoscale diamond particles are also dispersed in the suspension, the sub-micron sized and/or nanoscale diamond particles may be functionalized and/or treated with a surfactant in a manner similar to the plurality of microscale diamond particles, such as, for example, by any of the methods discussed previously. By delaying sedimentation of the plurality of microscale diamond particles, the quantities and proportions of microscale diamond particles provided within the suspension (e.g., for further processing) may be more precisely controlled.

Figure 2:
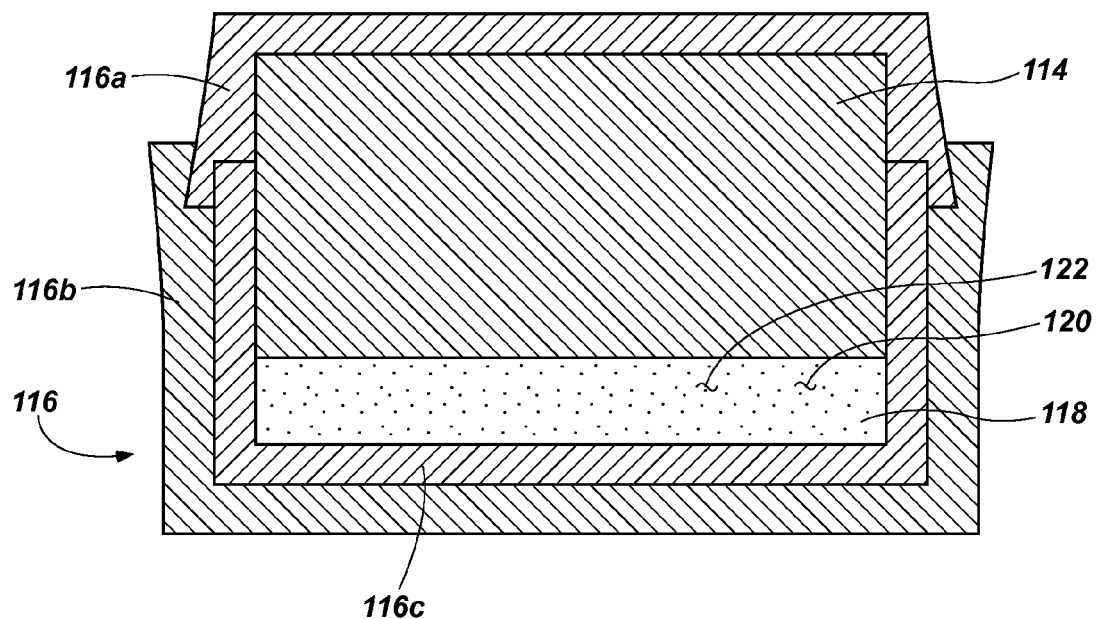
FIG. 2 is a cross-sectional view of a mold for forming a cutting element.

Referring to FIG. 2, a cross-sectional view of a mold 116 that may be used to form a cutting element is shown. Typically, cutting elements are formed using a high temperature/high pressure (HTHP) process to interbond individual diamond particles (e.g., diamond grains or crystals) while in the presence of a catalyst material (e.g., iron, nickel, cobalt, or other Group VIIIA materials), which may take place in the mold 116. The mold 116 may include one or more generally cup-shaped members, such as a first cup-shaped member 116*a*, a second cup-shaped member 116*b*, and a third cup-shaped member 116*c*, which may be assembled and swaged and/or welded together to form the mold 116. A plurality of diamond particles 118 comprising at least some functionalized microscale diamond particles, as described previously, may be disposed within the inner cup-shaped member 116*c*, as shown in FIG. 2, which has a circular end wall and a generally cylindrical lateral side wall extending perpendicularly from the circular end wall, such that the inner cup-shaped member 116*c* is generally cylindrical and includes a first closed end and a second, opposite open end. The plurality of diamond particles 118 may be provided in the form of a suspension by being dispersed in a fluid or gel continuous phase material 120, such as, for example, any of those described previously, and dispensed into the mold 116.

In some embodiments, the plurality of diamond particles 118 may optionally include nanoscale diamond particles, sub-micron sized diamond particles, or a combination of nanoscale and sub-micron sized particles in addition to the functionalized microscale diamond particles. The particles of the plurality of diamond particles 118 may be intermixed in a substantially uniform manner in some embodiments. In other embodiments, particles of differing sizes (i.e., microscale, sub-micron sized, nanoscale, or particle size groupings within these broader size range categories) may be deposited in selected regions (e.g., by layering) to form a particle size gradient within the plurality of diamond particles 118.

In addition to the functionalized microscale diamond particles, the suspension may optionally comprise a binder 122. The binder 122 may aid in binding the plurality of diamond particles 118 to retain shape during processing. Any suitable binder 122 may be used provided that the binder 122 does not significantly adversely affect the desired properties of the resulting structure (e.g., polycrystalline diamond material or abrasive composite material). Suitable binders 122 may comprise, for example, a metal material, such as a cobalt-containing material, a polymeric material, such as a polyacrylate or polyvinylbutyral, an organic material, such as a cellulosic material, combinations of these, or other binders 122 known in the art.

A substrate 114 comprising a hard material suitable for use in earth-boring applications may be disposed in the mold 116 adjacent the plurality of diamond particles 118. The hard material may comprise, for example, a ceramic-metal composite material (i.e., a "cermet" material) comprising a plurality of hard ceramic particles dispersed among a metal matrix material. The hard ceramic particles may comprise carbides, nitrides, oxides, and borides (including boron carbide ($B_4C$)). More specifically, the hard ceramic particles may comprise carbides and borides made from elements such as W, Ti, Mo, Nb, V, Hf, Ta, Cr, Zr, Al, and Si. By way of example and not limitation, materials that may be used to form hard ceramic particles include tungsten carbide, titanium carbide (TiC), tantalum carbide (TaC), titanium diboride ($TiB_2$), chromium carbides, titanium nitride (TiN), aluminum oxide ($Al_2O_3$), aluminum nitride (AlN), and silicon carbide (SiC). The metal matrix material of the ceramic-metal composite material may include, for example, cobalt-based, iron-based, nickel-based, iron- and nickel-based, cobalt- and nickel-based, and iron- and cobalt-based alloys. The matrix material may also be selected from commercially pure elements, such as, for example, cobalt, iron, and nickel. As a specific, non-limiting example, the hard material may comprise a plurality of tungsten carbide particles in a cobalt matrix, known in the art as cobalt-cemented tungsten carbide. Where the metal matrix material of the substrate 114 comprises a catalyst material, the catalyst material may sweep from the substrate 114 among the plurality of diamond particles 118 to catalyze particle-to-particle interbonding.

The plurality of diamond particles 118 and the substrate 114 may be sintered within the mold 116 to form a polycrystalline diamond table 112 (see FIG. 3) attached to an end of the substrate 114. For example, an HTHP process may be used to form the polycrystalline superabrasive material of the polycrystalline diamond table 112 (see FIG. 3) and may comprise pressing the plurality of diamond particles 118 in a heated press at a pressure of greater than about 5.0 GPa and at temperatures greater than about 1,350° C., although the exact operating parameters of HTHP processes will vary depending on the particular compositions and quantities of the various materials being used. The pressures in the heated press may be greater than about 6.5 GPa (e.g., about 7.0 GPa), and may even exceed 8.0 GPa in some embodiments. Furthermore, the materials being sintered may be exposed to such temperatures and pressures for a time period of between about 30 seconds and about 20 minutes, and specifically may be held at peak temperature and pressure for between about 30 seconds and 2 minutes. Thus, an abrasive article, such as a cutting element 110 (see FIG. 3), may be formed by incorporating the functionalized microscale diamond particles dispersed in the aqueous continuous phase material 120 therein.

Figure 3:
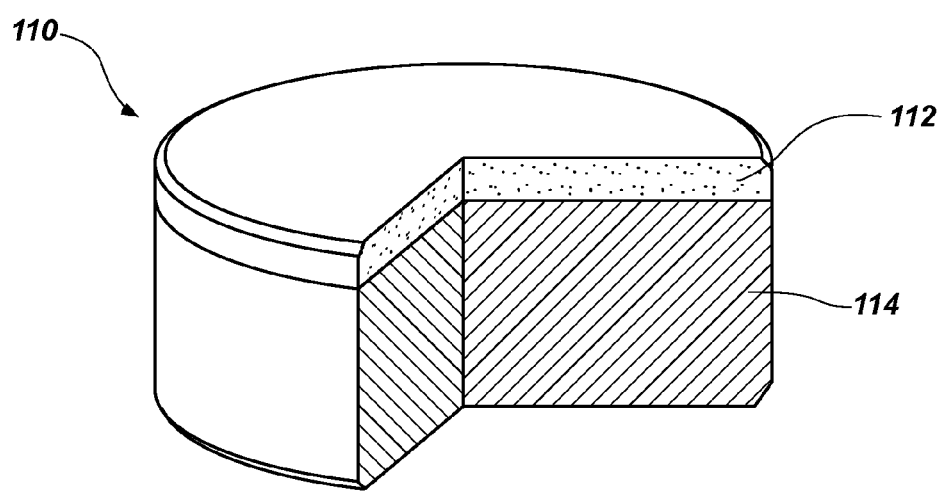
FIG. 3 is a partial cutaway perspective view of a cutting element that may be attached to an earth-boring tool.

Referring to FIG. 3, a partial cutaway perspective view of a cutting element 110 formed by an HTHP process that may be attached to an earth-boring tool is shown. The cutting element 110 comprises a polycrystalline diamond table 112 attached to an end of a substrate 114. The cutting element 110 is shown comprising a cylindrical shape, the polycrystalline diamond table 112 comprising a disc attached to an end of a cylindrical substrate 114. In other embodiments, the cutting element 110 may comprise other shapes, such as, for example, dome-tipped, pointed, tombstone, chisel-shaped, and other shapes for cutting elements known in the art. The polycrystalline diamond table 112 may be subjected to a leaching process to remove at least some of the catalyst material that may remain in the interstitial spaces among interbonded diamond grains to improve the thermal stability of the polycrystalline diamond table 112 in some embodiments. In other embodiments, the catalyst material disposed in the interstitial spaces among interbonded diamond grains may not be removed from the polycrystalline diamond table 122 by leaching.

Figure 4:
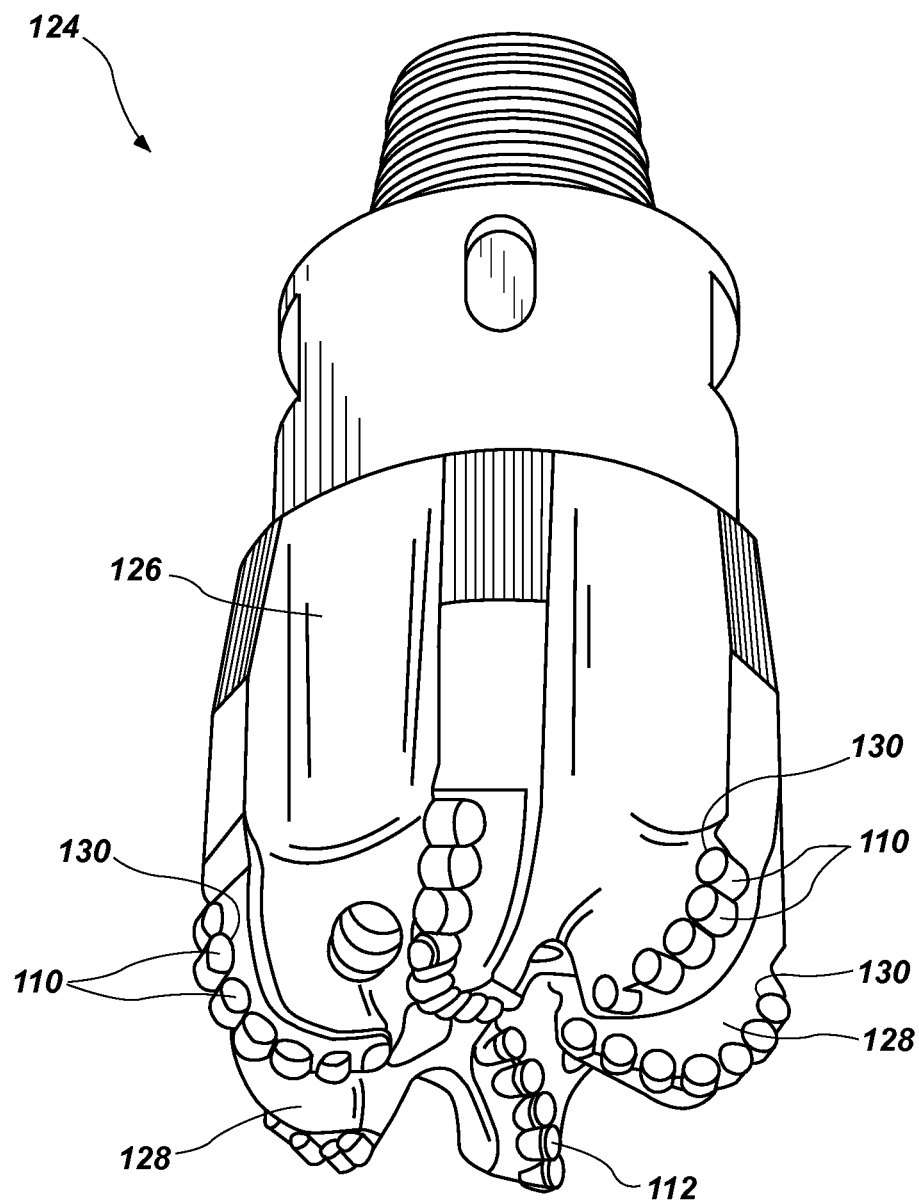
FIG. 4 is a perspective view of an earth-boring tool to which cutting elements may be attached.

Referring to FIG. 4, a perspective view of an earth-boring tool 124 to which cutting elements 110 may be attached is shown. The earth-boring drill tool 124 includes a bit body 126 having blades 128 extending from the bit body 126. The cutting elements 110 may be secured within pockets 130 formed in the blades 128. However, cutting elements 110 and polycrystalline diamond tables 112 as described herein may be bonded to and used on other types of earth-boring tools, including, for example, roller cone drill bits, percussion bits, impregnated bits, core bits, eccentric bits, bicenter bits, reamers, expandable reamers, mills, hybrid bits, and other drilling bits and tools known in the art.

Figure 5:
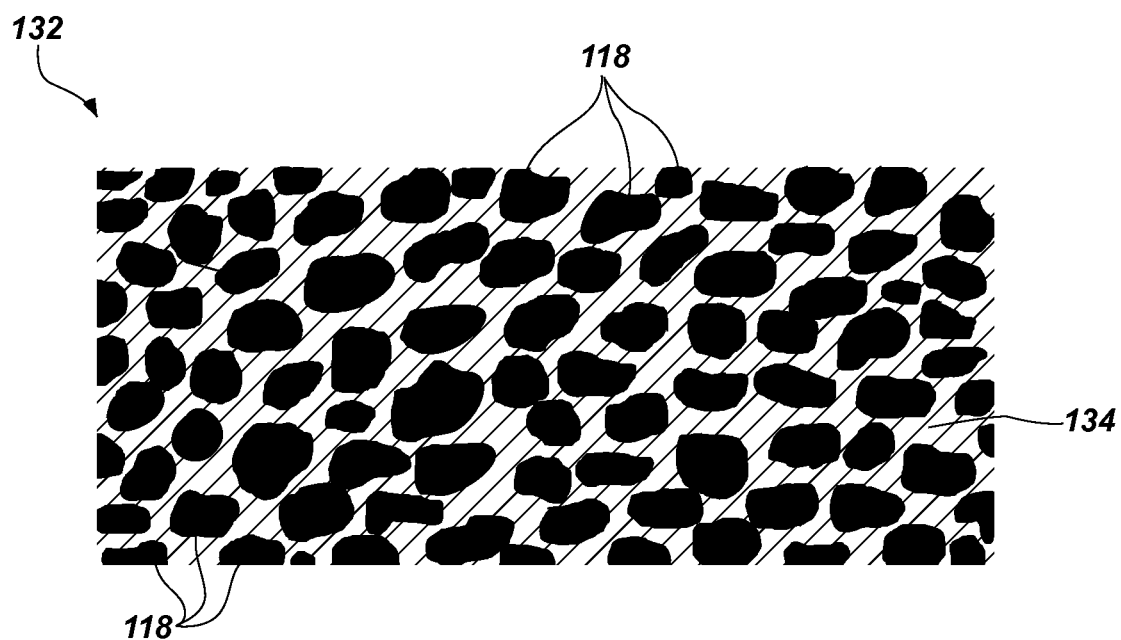
FIG. 5 is a simplified cross-sectional view of a diamond impregnated material.

Referring to FIG. 5, a simplified cross-sectional view of a diamond impregnated material 132 comprising a plurality of diamond particles 118 is shown. As discussed previously, the plurality of diamond particles 118 comprises at least some functionalized microscale diamond particles, and may optionally comprise nanoscale, sub-micron sized, or a combination of nanoscale and submicron sized particles as well. The particles of the plurality of diamond particles 118 are not interbonded to form polycrystalline diamond, but are dispersed within a solid continuous phase material 134. The solid continuous phase material 134 may comprise, for example, a metal (e.g., steel or copper) or a polymer (e.g., a thermoset). Functionalizing at least the microscale diamond particles of the plurality of diamond particles 118 may enable the microscale diamond particles to remain in the solid continuous phase material 134 during use for a longer period of time than if the microscale diamond particles were not functionalized. Thus, the resulting diamond impregnated material may have a longer useful life. By way of example, the diamond impregnated material 132 may form an earth-engaging portion of an impregnated drill bit. However, the diamond impregnated material 132 may also be used in portions of cutting elements, other earth-boring tools and drill bits, saw blades, grinding wheels, machining tooling or other abrasive or cutting articles known in the art.

The plurality of diamond particles 118 may be dispersed within the solid continuous phase material 134 in any of a number of ways. For example, the plurality of diamond particles 118 may be mixed with a resin, which may then be cured (e.g., by irradiation or chemical reaction in the case of an epoxy) to form the portion of the diamond impregnated material 132 shown in FIG. 5. As another example, the plurality of diamond particles 118 may be mixed with a powdered metal or polymer, which may then be flowed and subsequently solidified to form the portion of the diamond impregnated material 132 shown in FIG. 5. As a still further example, the plurality of diamond particles 118 may be infiltrated by a molten metal or polymer material, which may then be solidified to form the portion of the diamond impregnated material 132 shown in FIG. 5. The plurality of diamond particles 118 may be the only abrasive media in the impregnated material in some embodiments. In other embodiments, however, other abrasive particles (e.g., tungsten carbide particles) may also be dispersed among the plurality of diamond particles 118 in the solid continuous phase material 134.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

CONCLUSION

In some embodiments, methods of treating a plurality of particles comprise functionalizing a plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to outer surfaces of at least some particles of the plurality of microscale diamond particles. A stability of the functionalized plurality of microscale diamond particles in dispersion is increased as compared to a plurality of microscale diamond particles that has not been functionalized.

In other embodiments, methods of forming a suspension comprise functionalizing a plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to outer surfaces of at least some particles of the plurality of microscale diamond particles. The functionalized plurality of microscale diamond particles is dispersed in a fluid or gel continuous phase material.

In additional embodiments, methods of forming an abrasive article comprise functionalizing a plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to outer surfaces of at least some particles of the plurality of microscale diamond particles. The functionalized plurality of microscale diamond particles is incorporated into an abrasive article.

In still further embodiments, pluralities of functionalized particles comprise a functionalized plurality of microscale diamond particles comprising one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups covalently bonded to outer surfaces of at least some particles of the functionalized plurality of microscale diamond particles. The functionalized plurality of microscale diamond particles comprises a stability in dispersion greater than a stability in dispersion of a plurality of microscale diamond particles that has not been functionalized.

In yet other embodiments, suspensions comprise a functionalized plurality of microscale diamond particles comprising one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups covalently bonded to outer surfaces of at least some particles of the plurality of microscale diamond particles. The functionalized plurality of microscale diamond particles is dispersed in a fluid or gel continuous phase material, the functionalized plurality of microscale diamond particles being more stable in the fluid or gel continuous phase material than a plurality of microscale diamond particles that has not been functionalized.

What is claimed is:

1. A method of treating a plurality of particles, comprising:
graphitizing outer surfaces of a plurality of microscale diamond particles;
functionalizing the plurality of microscale diamond particles after graphitizing the outer surfaces of the plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to the outer surfaces of at least some particles of the plurality of microscale diamond particles; and
increasing a stability of the functionalized plurality of microscale diamond particles in dispersion as compared to a plurality of microscale diamond particles that has not been functionalized.

2. The method of claim 1, wherein increasing the stability of the functionalized plurality of microscale diamond particles in dispersion as compared to a plurality of microscale diamond particles that has not been functionalized comprises increasing the aqueous stability of the functionalized plurality of microscale diamond particles in dispersion as compared to a plurality of microscale diamond particles that has not been functionalized.

3. The method of claim 1, wherein functionalizing the plurality of microscale diamond particles comprises covalently bonding —OH functional groups to the outer surfaces of at least some diamond particles of the plurality of microscale diamond particles by reacting the plurality of microscale diamond particles with a reducing agent.

4. The method of claim 3, wherein reacting the plurality of microscale diamond particles with a reducing agent comprises reacting the plurality of microscale diamond particles with at least one of borane and lithium aluminum hydride.

5. The method of claim 3, wherein reacting the plurality of microscale diamond particles with a reducing agent comprises reacting the at least one diamond particle with the reducing agent at between 80° C. and 100° C. at atmospheric pressure for about 12 hours.

6. The method of claim 1, wherein the plurality of microscale particles comprises at least one agglomeration of microscale particles before functionalizing occurs and further comprising:
deagglomerating the plurality of microscale diamond particles before functionalizing the plurality of microscale diamond particles; and
covalently bonding at least one of -halides, —COOH, and —NH$_2$ groups to the outer surfaces of at least some particles of the plurality of microscale diamond particles before functionalizing the plurality of microscale diamond particles.

7. The method of claim 6, wherein the acts of deagglomerating the plurality of microscale diamond particles and covalently bonding at least one of -halides, —COOH, and —NH$_2$ groups to the outer surfaces of at least some particles of the plurality of microscale diamond particles comprise fluorinating a plurality of microscale diamond particles comprising at least one agglomeration of at least some particles of the plurality of microscale diamond particles.

8. The method of claim 6, wherein functionalizing the plurality of microscale diamond particles comprises covalently bonding glycol to the outer surfaces of at least some particles of the plurality of microscale particles by reacting the at least one of -halides, —COOH, and —NH$_2$ groups covalently bonded to the outer surfaces of at least some particles of the plurality of microscale diamond particles with glycol.

9. The method of claim 8, wherein reacting the at least one of -halides, —COOH, and —NH$_2$ groups covalently bonded to the outer surfaces of at least some particles of the plurality of microscale diamond particles with glycol comprises reacting the at least one of -halides, —COOH, and —NH$_2$ groups covalently bonded to the outer surfaces of at least some particles of the plurality of microscale diamond particles with glycol at between 100° C. and 200° C. at atmospheric pressure for between 4 hours and 12 hours.

10. The method of claim 1, wherein graphitizing the outer surfaces of the plurality of microscale diamond particles comprises exposing the plurality of microscale diamond particles to a temperature of about 1,400° C. or greater in a vacuum or non-oxidizing atmosphere.

11. A method of forming a suspension, comprising:
graphitizing outer surfaces of a plurality of microscale diamond particles;
functionalizing the plurality of microscale diamond particles after graphitizing the outer surfaces of the plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to the outer surfaces of at least some particles of the plurality of microscale diamond particles; and
dispersing the functionalized plurality of microscale diamond particles in a fluid or gel continuous phase material.

12. The method of claim 11, wherein dispersing the functionalized plurality of microscale diamond particles in the fluid or gel continuous phase material comprises forming hydrogen bonds with at least one of the molecular groups covalently bonded to the outer surface of at least some particles of the functionalized plurality of microscale diamond particles by dispersing the functionalized plurality of microscale particles in at least one of water, aqueous solutions having a pH of between 2 and 10, and water miscible organic solvents.

13. The method of claim 11, further comprising:
treating the outer surfaces of the plurality of microscale particles with a surfactant before dispersing the functionalized plurality of microscale particles in the fluid or gel continuous phase material.

14. The method of claim 11, further comprising:
dispersing at least one of a plurality of sub-micron sized diamond particles and a plurality of diamond nanoparticles in the fluid or gel continuous phase material.

15. A method of forming an abrasive article, comprising:
graphitizing outer surfaces of a plurality of microscale diamond particles;
functionalizing the plurality of microscale diamond particles after graphitizing the outer surfaces of the plurality of microscale diamond particles by covalently bonding one or more molecular groups selected from the group consisting of —OH functional groups, —COOH functional groups, —R—COOH functional groups, wherein R comprises alkyls, -Ph-COOH functional groups, wherein Ph comprises phenolics, polymers, oligomers, monomers, glycols, sugars, ionic functional groups, metallic functional groups, and organo-metallic functional groups to the outer surfaces of at least some particles of the plurality of microscale diamond particles; and
incorporating the functionalized plurality of microscale diamond particles into an abrasive article.

16. The method of forming an abrasive article of claim 15, further comprising:
dispersing the functionalized plurality of microscale diamond particles in a fluid or gel continuous phase material.

17. The method of forming an abrasive article of claim 15, wherein incorporating the functionalized plurality of microscale diamond particles into the abrasive article comprises dispersing the functionalized plurality of microscale diamond particles in a solid continuous phase material.

18. The method of forming an abrasive article of claim 17, wherein dispersing the functionalized plurality of microscale diamond particles in the solid continuous phase material comprises infiltrating the functionalized plurality of microscale diamond particles with a metal matrix material.

19. The method of forming an abrasive article of claim 15, wherein incorporating the functionalized plurality of microscale diamond particles into the abrasive article comprises forming a polycrystalline diamond table attached to an end of a substrate by disposing the functionalized plurality of microscale diamond particles adjacent the end of the substrate and sintering the functionalized plurality of microscale diamond particles.

20. The method of claim 19, wherein sintering the functionalized plurality of microscale diamond particles comprises subjecting the functionalized plurality of microscale diamond particles and the substrate to an HTHP process, comprising:
exposing the functionalized plurality of microscale diamond particles and the substrate to a temperature of at least 1350° C.; and
pressing the functionalized plurality of microscale diamond particles and the substrate with a pressure of at least 5.0 GPa.

* * * * *

UNITED STATES PATENT AND TRADEMARK OFFICE
CERTIFICATE OF CORRECTION

PATENT NO. : 8,784,520 B2  
APPLICATION NO. : 13/174031  
DATED : July 22, 2014  
INVENTOR(S) : Soma Chakraborty and Gaurav Agrawal Page 1 of 1

It is certified that error appears in the above-identified patent and that said Letters Patent is hereby corrected as shown below:

On the title page:
In ITEM (57) ABSTRACT: LINE 4 change "from OH" to --from –OH--

Signed and Sealed this
Twenty-fourth Day of November, 2015

Michelle K. Lee
*Director of the United States Patent and Trademark Office*